United States Patent
Martel et al.

(10) Patent No.: US 9,120,244 B2
(45) Date of Patent: Sep. 1, 2015

(54) APPARATUS FOR REGENERATING VULCANIZED RUBBER

(71) Applicant: PHOENIX INNOVATION TECHNOLOGY INC., Westmount (CA)

(72) Inventors: Sylvain Martel, Sainte-Therese (CA); Stephen Murphy, Montreal (CA); Patrick Legault, Saint-Louis de Gonzague (CA)

(73) Assignee: PHOENIX INNOVATION TECHNOLOGY INC., Westmount, Quebec (CA)

( * ) Notice: Subject to any disclaimer, the term of this patent is extended or adjusted under 35 U.S.C. 154(b) by 0 days.

(21) Appl. No.: 14/192,612

(22) Filed: Feb. 27, 2014

(65) Prior Publication Data

US 2014/0178265 A1 Jun. 26, 2014

Related U.S. Application Data

(62) Division of application No. 13/634,629, filed as application No. PCT/CA2011/000285 on Mar. 15, 2011, now Pat. No. 8,697,761.

(60) Provisional application No. 61/313,871, filed on Mar. 15, 2010.

(51) Int. Cl.
*B29B 7/16* (2006.01)
*B01F 7/00* (2006.01)
(Continued)

(52) U.S. Cl.
CPC .............. *B29B 7/16* (2013.01); *B01F 7/00708* (2013.01); *B01F 7/048* (2013.01);
(Continued)

(58) Field of Classification Search
CPC ......... B29B 7/16; B29B 7/125; B01F 7/0078; B01F 7/048; B01F 15/063; B01F 15/00844; B01F 2015/061; C08L 21/00; C08L 2666/08; C08L 9/06; C08L 19/003; C08K 3/06
See application file for complete search history.

(56) References Cited

U.S. PATENT DOCUMENTS 2,806,821 A 9/1957 Hill
3,563,922 A 2/1971 Massoubre et al.
(Continued)

FOREIGN PATENT DOCUMENTS

FR 2846661 5/2004
JP 2-215376 8/1990
JP 2609578 5/1997

OTHER PUBLICATIONS

"Evaluation of Waste Tire Devulcanization Technologies," CalRecovery, Inc., Dec. 2004, pp. 1-19.
(Continued)

*Primary Examiner* — Frances Tischler
(74) *Attorney, Agent, or Firm* — Pauly, Devries Smith & Deffner, LLC

(57) ABSTRACT

Disclosed is a regenerated rubber, a method and an apparatus for obtaining regenerated rubbers from vulcanized crumb rubber, such as rubber from scrap. The apparatus is a thermokinetic mixer having the particularity to have an air tight stationary chamber with inner non-uniform surface. The method comprises the steps of raising the speed of the rotor shaft in order to increase a temperature of a mixture made of vulcanized crumb rubber and a lubricant, such as oil, until a devulcanizing temperature is reached; and reducing the temperature of the mixture to a lower temperature during a second period of time. The method of the invention is environmentally friendly or "green" since the regeneration method does not use chemicals, includes a shorter period of treatment at higher temperature avoiding the risks of rubber cracking and spontaneous combustion, and further allowing mass-production of regenerated rubber with lower energy consumption.

19 Claims, 6 Drawing Sheets

(51) Int. Cl.
*B01F 7/04* (2006.01)
*B01F 15/00* (2006.01)
*B01F 15/06* (2006.01)
*B29B 7/12* (2006.01)
*C08L 9/06* (2006.01)
*C08L 19/00* (2006.01)
*C08L 21/00* (2006.01)
*C08K 3/06* (2006.01)

(52) U.S. Cl.
CPC ........ *B01F 15/00844* (2013.01); *B01F 15/063* (2013.01); *B29B 7/125* (2013.01); *C08L 9/06* (2013.01); *C08L 19/003* (2013.01); *C08L 21/00* (2013.01); *B01F 2015/061* (2013.01); *C08K 3/06* (2013.01)

(56) References Cited

U.S. PATENT DOCUMENTS

| | | |
|---|---|---|
| 4,148,763 A | 4/1979 | Bryson |
| 5,798,394 A | 8/1998 | Myers et al. |
| 5,883,140 A | 3/1999 | Fisher et al. |
| 6,037,418 A | 3/2000 | Mukai et al. |
| 6,133,413 A | 10/2000 | Mouri et al. |
| 6,364,520 B1 | 4/2002 | Steele |
| 6,548,560 B1 | 4/2003 | Kovalak et al. |
| 6,709,146 B1 | 3/2004 | Little et al. |
| 7,182,762 B2 | 2/2007 | Bortkiewicz |
| 7,189,762 B2 | 3/2007 | Tzoganakis |
| 7,342,052 B2 | 3/2008 | Fulford et al. |
| 7,540,651 B2 | 6/2009 | Matsumoto et al. |
| 2009/0294562 A1 | 12/2009 | Higginson et al. |
| 2013/0023595 A1 | 1/2013 | Martel et al. |

OTHER PUBLICATIONS

International Preliminary Report on Patentability from International Application No. PCT/CA2011/000285, corresponding to U.S. Appl. No. 13/634,629, issued Sep. 18, 2012, 7 pgs.

Klingensmith, Bill, "Recycling, Production and Use of Reprocessed Rubbers," Rubber World, Mar. 1991, pp. 16-21.

Non-Final Office Action from U.S. Appl. No. 13/634,629, mailed Aug. 7, 2013, 29 pages.

Notice of Allowance for U.S. Appl. No. 13/634,629, mailed Nov. 29, 2013 (11 pages).

Written Opinion of the International Searching Authority from International Application No. PCT/CA2011/000285, mailed Jun. 7, 2011, pp. 1-6.

APPARATUS FOR REGENERATING VULCANIZED RUBBER

This application is a divisional of U.S. National Stage application Ser. No. 13/634,629, filed Sep. 13, 2012, now U.S. Pat. No. 8,697,761, issued Jun. 26, 2014, which claims the benefit of International Application PCT/CA2011/000285, filed Mar. 15, 2011 and the benefit of U.S. Provisional Application No. 61/313,871, filed Mar. 15, 2010, the contents of which are herein incorporated by reference in their entirety.

FIELD OF THE INVENTION

The present invention relates to the field of recycling, production and use of regenerated or reprocessed rubber, and more particularly, but not exclusively, to a new environmentally friendly or "green" method and apparatus for regenerating vulcanized crumb rubber from scrap.

DESCRIPTION OF THE PRIOR ART

Tires are among the largest and most problematic sources of waste, due to the large volume produced and their durability. Those same characteristics which make waste tires such a problem also make them one of the most re-used waste materials, as the rubber is very resilient and can be reused in other products. Tires or other rubber articles are also often recycled, for example, for use as tire derived fuel, civil engineering applications, sport fields and new shoe products.

Tires are principally made of rubber, but the chemical composition of each tire depends on the origins of tires. For example truck tires, car tires or off-road tires are principally made of styrene-butadiene rubber (SBR) and natural rubber at different concentrations. Scrap rubber also comes from other sources such as vibrators and seals; glass-run channels; radiators, garden and appliance hoses; tubing; washers; belts; electrical insulation, and speaker cone surrounds. Rubber is also used as a medium for water resistance in high-voltage polymeric cable jointing installations, roofing membrane, geomembranes, rubber mechanical goods, plastic impact modification, thermoplastics, vulcanizates, as a motor oil additive, pond liner, electrical cable-jointing, RV roofs, and chainmail applications. In these specific cases, rubber is principally made of ethylene propylene diene monomer (EPDM) rubber (M-class rubber).

By "regeneration" or "regenerating" of the rubber, it is meant that the original vulcanized rubber undergoes a partial devulcanization, and also a modification of its different properties such as surface area, sieve diameter or density.

Devulcanization is a potential method of recycling or reclaiming waste tire rubber. Devulcanization of rubber has a long history, but renewed interest in the subject has arisen during the past ten to fifteen years due to increased regulatory and public concern for properly managing tire waste. As its name implies, in the process of devulcanization, the structure of the vulcanized waste rubber is modified. The resulting devulcanized material can be revulcanized or transformed into useful products. Devulcanized rubber is a highly valued form of waste rubber.

By "Vulcanization", it is meant that there is a thermo-chemical process that incorporates sulphur and sulphur crosslinks into a mixture of rubber molecules in order to provide the elasticity and other properties that are desired in manufactured rubber products. In the process, sulphur atoms are chemically bonded to the carbon molecules of rubber molecules and serve as crosslinks (chemical bonds) between the sulfidic rubber molecules. The vulcanization process is irreversible at standard atmospheric conditions of temperature and pressure.

Historically and practically, the concept of rubber devulcanization consists of the cleavage of intermolecular bonds of the chemical network, such as carbon-sulphur (C—S) and/or sulphur-sulphur (S—S) bonds, with further shortening of the chains also occurring. Chemically speaking, devulcanization is the process of cleaving the monosulfidic, disulfidic, and polysulfidic crosslinks (carbon-sulphur or sulphur-sulphur bonds) of vulcanized rubber. Ideally, devulcanized rubber can be revulcanized with or without the use of other compounds.

The different types of devulcanization processes also modify other properties of the rubbers. These processes cause the reduction of some properties over those of the parent rubber. Ideally, devulcanization would yield a product that could serve as a substitute for virgin rubber, both in terms of properties and in terms of cost of manufacturing.

There are several major markets in use today for the recycling of elastomers or rubber from scrap: tire derived fuel, punched or stamped products from tire carcasses, mats and many low end applications using bonding technologies of the crumb rubber. Various patented methods are taught a chemical partial devulcanization of scrap rubber using a chemical treatment that involves thermal, mechanical energy or other forms of energy such as ultra sonic treatment. See for example U.S. Pat. No. 4,148,763 (Bryson), U.S. Pat. No. 5,798,394 (Myers et al.); U.S. Pat. No. 6,133,413 (Mouri et al.) and U.S. Pat. No. 6,548,560 (Kovalak et al.), and French patent application no. 2,846,661 (Schaumburg). However, those issues that deal with regenerated rubber derived from some chemical treatment of vulcanized rubber, are not a promising alternative to solutions respecting the environment.

Processes for recycling rubber and the main ways for such recycling are described below. For more details, the reader is intended to consult the article by Bill Klingensmith, "Recycling, production and use of reprocessed rubbers", Rubber World, March 1991, pages 16-21.

Ultrasound Recycling:

High-power ultrasound is applied to the cured rubber during extrusion, and high pressure, heat and mechanical energy break the sulphur cross-links, making the extrudate a gum rubber-like new material, that can be re-cured and molded into new rubber products.

Tire Pyrolysis:

The pyrolysis method for recycling of used tires is a technique that uses a special mechanism to heat the used tires in a closed, oxygen-free environment—a stove to melt the tires down into the materials that they were made of.

Microwave Recycling:

The microwaves excite the rubber until it is in a gaseous state which will be condensed into its component parts including diesel, syngas as well as carbon black and plated steel. No emissions are created in this process and all components can be reutilized.

Supercritical Fluid:

WO 2003/029298 granted as U.S. Pat. No. 7,182,762 (TZOGANAKIS), disclose a process of modifying crosslinked rubber comprising subjecting the rubber to mechanical elongation and shear forces in the presence of supercritical $CO_2$ fluid that is normally gaseous. This process allows a controllable devulcanization of the rubber. The devulcanized rubber is commercialized under the trade-mark TYROMER®.

Unfortunately, large-scale commercial applications of these methods are prohibited either from an economical point of view or in regard to the poor properties of the products obtained from the proposed processes.

There have been attempts for devulcanizing waste tire material using a milling process in combination or not with chemical agents. For example, U.S. Pat. No. 5,883,140 (Fisher et al., 1999) discloses a process for the making of reclaim rubber obtained from vulcanized rubber by subjecting a mass of the rubber to highly intensive mechanical impact forces using a speed of rotor blades between 3000 and 4000 rpm at temperatures lesser than 250° C. The process can be used with the addition of small amounts (usually of the order of 1% to 2% by weight) of various chemicals known to retard cure rates in rubber.

U.S. Pat. No. 7,342,052 (Fulford et al., 2008) discloses a process for converting an elastomer from scrap to a regenerated elastomer, by introducing the elastomer from scrap into a vessel (in particular a GELIMAT® mixer), agitating and then heating to a temperature below a temperature where the elastomer begins to degrade. Hot oil (190-200° C.) is then introduced into the vessel to be admixed to the elastomer from scrap. The mixture is then cooled down. One of the major drawbacks of this process resides in that the oil has to be pre-heated to a temperature around 200° C. before being added to the rubber.

The first step of processing tires generally consists in shredding or crushing the tire until crumb rubber of different mesh sizes is obtained. The crumb rubber is then sold for different applications according to their mesh size. Smaller crumb rubber with a mesh size distribution between about 30 and 80, are also formed during the crushing process. They are generally only a cheap "filler" material and are rarely used in high volumes. Indeed, the crumb rubber does not adhere very well when used as a filler with another compound (such as a polymer or the like) as it presents a low active specific surface ($m^2/g$) and are still vulcanized (high cross-link density).

It is known that thermokinetic mixers may be generally used for mechanical recycling of crumb rubber. However, thermokinetic mixers of the art are not to be efficient enough for treating crumb rubber that is a by-product of crushing the rubber.

Hence, in light of the aforementioned, there is still a need for an improved, less expensive and faster method and apparatus for regenerating vulcanized crumb rubber, which by virtue of their steps, design and components, would be able to overcome some and preferably all of the aforementioned prior art problems.

SUMMARY OF THE INVENTION

It is therefore an object of the invention to provide a method and an apparatus for converting an elastomer or vulcanized rubber from scrap to a regenerated elastomer or rubber. It is another object of the present invention to provide a regenerated rubber having properties similar to a corresponding virgin rubber.

According to one aspect of the invention, there is provided a method for regenerating vulcanized crumb rubber which comprises the steps of:
a) introducing vulcanized crumb rubber and a lubricant into a first mixer, the lubricant being at room temperature;
b) mixing the crumb rubber and lubricant at room temperature during an adequate period of time to form a mixture;
c) transferring said mixture into a thermokinetic mixer, the thermokinetic mixer comprising:
   an air tight stationary chamber for receiving the mixture, the chamber having an inner non-uniform surface; and
   a rotor shaft co-axially extending into the chamber, the rotor shaft having blades extending from the shaft into the chamber and a controlled speed varying up to at least about 2000 rpm;
d) raising the speed of the rotor shaft in order to increase a temperature of the mixture during a first period of time until a devulcanizing temperature is reached;
e) reducing the temperature of the mixture reached in step d) to a lower temperature during a second period of time; and
f) recovering regenerated crumb rubber from the chamber.

According to another aspect of the invention, there is provided a regenerated crumb rubber obtained by the method defined above.

According to another aspect of the invention, there is provided a thermokinetic mixer for the regeneration of vulcanized crumb rubber. The thermokinetic mixer comprises:
a stationary chamber for receiving the crumb rubber to be regenerated, the chamber having an inner non-uniform surface; and
a rotor shaft co-axially extending into the stationary chamber, the rotor shaft having blades extending from the shaft into the chamber and a controlled speed varying up to at least about 2000 rpm.

According to another aspect of the invention, there is provided a device assembly for regenerating a vulcanized rubber. The device assembly comprises:
a mixer for mixing crumb rubber and a lubricant at room temperature during an adequate period of time to form a mixture;
a thermokinetic mixer as defined above; and
a transfer device for transferring the mixture from the mixer into the thermokinetic mixer.

According to another aspect of the invention, there is provided a process for making vulcanized rubber comprising the steps of:
adding a mixture comprising regenerated crumb rubber as obtained by the method defined above and an adequate amount of a vulcanization agent, to a virgin rubber polymer to be vulcanized; and
submitting said mixture and virgin rubber polymer to vulcanization in order to obtain the vulcanized rubber.

One of the advantages of the invention resides in the use of a lubricant at room temperature to be mixed with the vulcanized crumb rubber, reducing as such energy consumption.

Another advantage resides in the fact that the method does not need the use of chemical help devulcanization product, making this method environmentally friendly or "green".

The method and apparatus of the invention lead to a partial devulcanization, increased diameter and increased specific surface area of the crumb rubber using an easy method. A portion of the inside surface and outside surface of the treated material is devulcanized which combined with the increased specific surface area allows for the mixture with other compounds, such as polymers or virgin rubber, and the formation by vulcanization of new cross-linked rubber.

The invention and its advantages will be better understood upon reading the following description of preferred embodiments made with reference to the accompanying drawings.

DETAILED DESCRIPTION OF THE INVENTION

Figure 1:
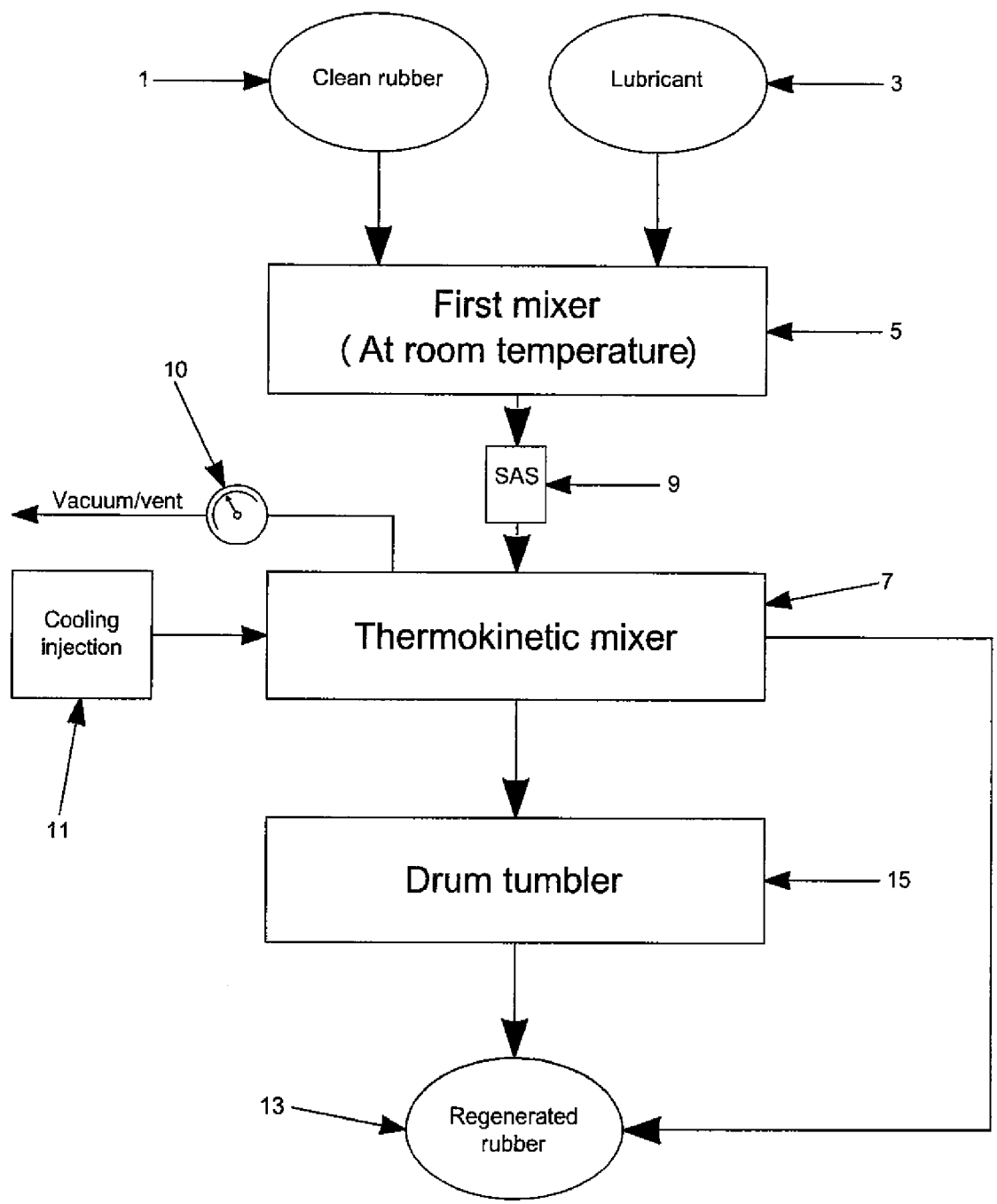
FIG. 1 is a flow chart illustrating the method and device assembly according to preferred embodiments of the invention.

As aforesaid, according to a first aspect of the invention, vulcanized rubber can be regenerated by treating the rubber as follows. The method and device assembly may be illustrated according to the flow chart of FIG. 1.

The first step a) of the method consists in introducing vulcanized crumb rubber (1), preferably pre-washed clean and ground crumb rubber, and a lubricant (3) into a batch mixer (5), the lubricant (3) and the batch mixer (5) being at room temperature. The batch mixer (5) used may be any kind of industrial mixer known in the art.

By "room temperature" or "ambient temperature" used herein, it has to be understood the temperature where the different material of the present invention are treated, stored or used, otherwise specified. Preferably, room temperature is from about 15 to 30° C., more preferably from 20 to 25° C.

By "vulcanized rubber", it has to be understood rubber that was previously vulcanized by well known processes of the art such as rubber that is a by-product of recycled rubber from scrap. Preferably, the vulcanized rubber from scrap is tire rubber (car tires, truck tires, off-road tires, or the like), shoes or other goods made of vulcanized rubber. Rubbers are generally made of natural rubber or synthetic rubbers such as as SBR (styrene-butadiene rubber), or EPDM (ethylene propylene diene monomer (M-class)) rubber.

By "crumb", it has to be understood rubber solid crumb having a mesh size lower (crumb size larger) than 10, preferably from 10 to 100. As well known in the art, the crumb size is not a uniform value, but rather a distribution of different mesh sizes defined by the number of holes per square inch. Preferably, the crumb rubber must be "fresh" and must not have been exposed to the elements (ex: UV, extreme temperatures).

By "lubricant", it has to be understood any kind of solid or liquid lubricant known in the art as thermal transfer materials that reduce friction. The presence of the lubricant in the present method encourages the "expansion" of the crumb which results in higher diameter and specific surface area as demonstrated herein after. Liquid lubricant may be an organic solvent or oil such as a vegetable oil (canola, corn oil, or the like) or a mineral oil. The oil can further be virgin, recycled or processed. Solid lubricant may be carbon black, talc, graphite, paraffin in a solid or paste form, any other solid lubricant having a fine powder form known in the art, or a mixture thereof.

When the lubricant is vegetable oil, it eliminates toxic gases during the regeneration method. Vegetable oil renders the method more "green" and human friendly, and is also less expensive.

The lubricant is preferably added to the crumb rubber as a percentage of the total mass (weight percent or wt. %). Preferably, one or more lubricants can be present in the raw material in a range from about 2 to 12 wt. %, more preferably about 5 wt. % (i.e. if 100 lbs of crumb rubber are treated, then 5 lbs of oil are added for a total of 105 lbs).

By the term "about" used in the present description and claims, it has to be understood that the measures indicated herein have a precision which cannot be inferior to the precision of the apparatus used to get this measure. It is commonly accepted that a 10% precision measure is acceptable and encompasses the term "about".

The second step b) of the method consists in mixing the crumb rubber (1) and lubricant(s) (3) at room temperature during an adequate period of time to form a mixture.

By "adequate period of time", it has to be understood a period of time that is sufficient to allow the lubricant to mix and/or penetrate the crumb rubber. This period of time will vary upon the amount of vulcanized crumb rubber (1) to mix, the nature of the selected lubricant (liquid or solid), and the model of the mixer used in this second step. Preferably, the adequate period of time is from about 2 to 15 minutes.

The third step c) of the method consists in transferring the mixture rubber/lubricant made in step b) into a thermokinetic mixer (7). Preferably, such transfer is done via an isolation chamber such as a SAS (9). More preferably, the isolation chamber is an air-tight isolation chamber. By "air-tight isolation chamber", it has to be understood that the isolation chamber of the device assembly is preferably hermetic in order to avoid air and oxygen to penetrate into the isolation chamber.

Preferably, the first mixer (5) is positioned above a SAS (9) which is positioned above the thermokinetic mixer (7) in order to take advantage of gravity.

The thermokinetic mixer of the invention, or hereinafter also named K-mixer, includes all the characteristics of a thermokinetic mixer known in the art, such as the GELIMAT® described in U.S. Pat. No. 5,883,140. By virtue of the highly intensive mechanical impact to which the mass is subjected and of rubber's properties of kinematic restitution it will usually exhibit a fairly rapid rise in temperature during the course of the process, for example as a result of hysteresis or internal friction losses arising from the rapid deformation and elastic restoration of shape of the crumb following the impacts discussed above. Preferably, the working is such that the mass exhibits a rate of temperature rise of about 5° C./sec to about 60° C./sec, more preferably about 10° C./sec to about 50° C./sec.

In comparison to the GELIMAT®, the K-mixer of the invention has been improved. First, the K-mixer has an air tight stationary chamber for receiving the mixture with the particularity that the chamber has an inner non-uniform surface. The K-mixer has a rotor shaft rotatably and co-axially mounted within the chamber. The rotor shaft has blades extending from the shaft into the chamber and a controlled speed varying up to at least about 2000 rpm (revolutions per minute).

The thermokinetic mixer may be equipped with a variable electric speed control. The high speed K-mixer has a rotational shaft having a rotation rising up from about 400 rpm to about 1400 to 2000 rpm, or more if necessary. In a K-mixer, the temperature varies in function of the speed of the K-mixer shaft and blades. Preferably, the radius of the K-mixer shaft and blade combination is about 8 inches (20.3 cm). Further descriptions of preferred embodiments regarding the K-mixer of the invention are given herein after.

By "air tight", it has to be understood that the chamber of the K-mixer is preferably hermetic in order to avoid air and oxygen to penetrate into the chamber that could lead to a spontaneous combustion of the crumb rubber at high temperatures. More preferably, the chamber is further connected to a vacuum pump (10) for vacuuming the chamber during the treatment.

In the fourth step d) of the method, the speed of the rotor shaft is raised in order to impact the crumb rubber and to increase the temperature of the mixture during a first period of time until a devulcanizing temperature is reached. Preferably, the controlled speed of the shaft is about 400 rpm when the temperature of the thermokinetic mixer is at about room temperature and about 1400 to 2000 rpm when the temperature is at about the devulcanizing temperature.

By "devulcanizing temperature", it has to be understood that is the temperature of full or partial cleaving of the monosulfidic, disulfidic and polysulfidic cross-links (carbon-sulphur or sulphur-sulphur bonds) of the vulcanized rubber. Ideally, the devulcanization would yield a regenerated rubber that could serve as a substitute for virgin rubber, both in terms of properties and in term of cost of manufacture.

Preferably, the devulcanizing temperature reached in step d) is about 300° C. to about 330° C., more preferably 315° C. The devulcanizing temperature is reached in a short period of time between about 5 to 30 seconds, preferably in about 20 seconds as shown in the example illustrated in FIG. 2. Then the temperature remains constant for about 0.25 to 3 second before being lowered.

In the fifth step e) of the method, the temperature of the mixture is reduced to a lower temperature during a second period of time. Preferably, this lower temperature is about 150 to 250° C. and the second period of time is about 2 to 30 seconds.

Preferably, steps d) and e) are performed within an interval of time of about 120 seconds, more preferably in less than 60 seconds. The use of a new thermokinetic mixer, which by virtue of its components allows a reduction of the treatment time at higher temperature, avoids the risks of rubber cracking and spontaneous combustion, further allowing mass-production of regenerated crumb rubber with lower energy consumption.

Reducing the temperature of the mixture into the chamber consists in reducing the speed of the rotor shaft, preferably from 1400-2000 rpm to about 400 rpm, and injecting into the chamber a cooling agent. The cooling agent may be any kind of known cooling agent having the properties of allowing the dissipation of the thermal energy. The cooling agent can be injected in different form such as in the form of a jet stream or a mist.

More preferably, the cooling agent or solution is water that has the property to vaporize in contact with the hot rubber. The vapour then may exit the K-mixer, carrying out impurities and sulphur derivatives stemmed from the partial devulcanization of the rubber.

In addition or not with the injection of water described above, the mixture can be cooled down by cooling the inner surface of the K-mixer. As it will be described herein after, a water jacket may be used under the surface of the chamber.

The chamber of the K-mixer has an available internal volume, i.e the total volume of the chamber minus the volume occupied by the rotor shaft and blades. Preferably, in order to improve impacts and frictions of the mixture with itself, above about 50% of the available internal volume is occupied by the mixture, preferably from about 50% to about 90%, more preferably two third of the internal volume i.e. about 67%.

In a sixth step f) of the method, the rubber exits the K-mixer (7) as regenerated rubber (13).

As illustrated in FIG. 1, the method may further comprise a seventh step g) consisting in further cooling down the mixture from about 150 to 250° C. to about 20 to 70° C. within a period of time of about 10-45 seconds, when transferring the mixture from the chamber (22) of the K-mixer (7) into a drum tumbler (15). It is clear that other methods can be used for cooling down the rubber when it exits the K-mixer. The advantage of using a drum tumbler is that the rubber cools and expands quickly. The rubber can be left on a large surface to cool down by itself. A Peltier cooler may also be used alone or in combination with other cooling systems to help the final cooling of the devulcanized crumb rubber.

According to another aspect of the invention, there is provided regenerated crumb rubber obtained by the method detailed above.

Preferably, the method of the invention allows the making of solid regenerated crumb rubber with mesh sizes typically in the range of 10 to 40. This crumb rubber can be used as a material in various applications that feature vulcanization.

Regenerated rubbers may be characterized by evaluating or measuring physical and/or chemical properties well known in the art such as sieve diameters (mesh size distribution) using granulometry, density, acetone extract content, volatile content, regeneration/devulcanization degree, thermostability, ash content, morphology, specific surface area.

Among these methods of characterization that will be detailed in the examples hereinafter, the measure of the devulcanization degree (sulphur-bridge crosslink density), the diameter (mesh size distribution) and the specific surface area remain the most interesting parameters to quantify the quality of the regenerated rubber to be commercialized. Furthermore, these properties allow for easy differentiation between the regenerated rubber from the original vulcanized rubber used in step a) of the method, and also from the other regenerated rubber obtained by different known process of the art.

For instance, the regenerated rubber may have a lower crosslink density compared to a crosslink density of the vulcanized rubber of step a). Regenerated rubbers may have from 20% to 90%, preferably from about 28% to 77%, more preferably a weighted average value of 61%, less cross links than the vulcanized crumb rubber of step a).

The diameter of the vulcanized crumb rubber in step a) and devulcanized material can be quantified using the mesh sizes from the sieves. The vulcanized crumb rubber with the initial mesh distribution between about 30 and 80 mesh and with a weighted average mesh size of approximately 40 would result in a devulcanized mesh size distributed between about 10 and 40 with weighted average mesh size of approximately 14.

The regenerated rubber obtained by the method of the invention may have a specific surface area higher than about 0.8 $m^2/g$, or about 2 to 5 times higher than a specific surface area of the vulcanized rubber of step a).

The examples below show that the regenerated rubber of the invention confers equivalent or even better properties to a compound when the regenerated rubber is used as filler in comparison with an untreated rubber.

Figure 4:
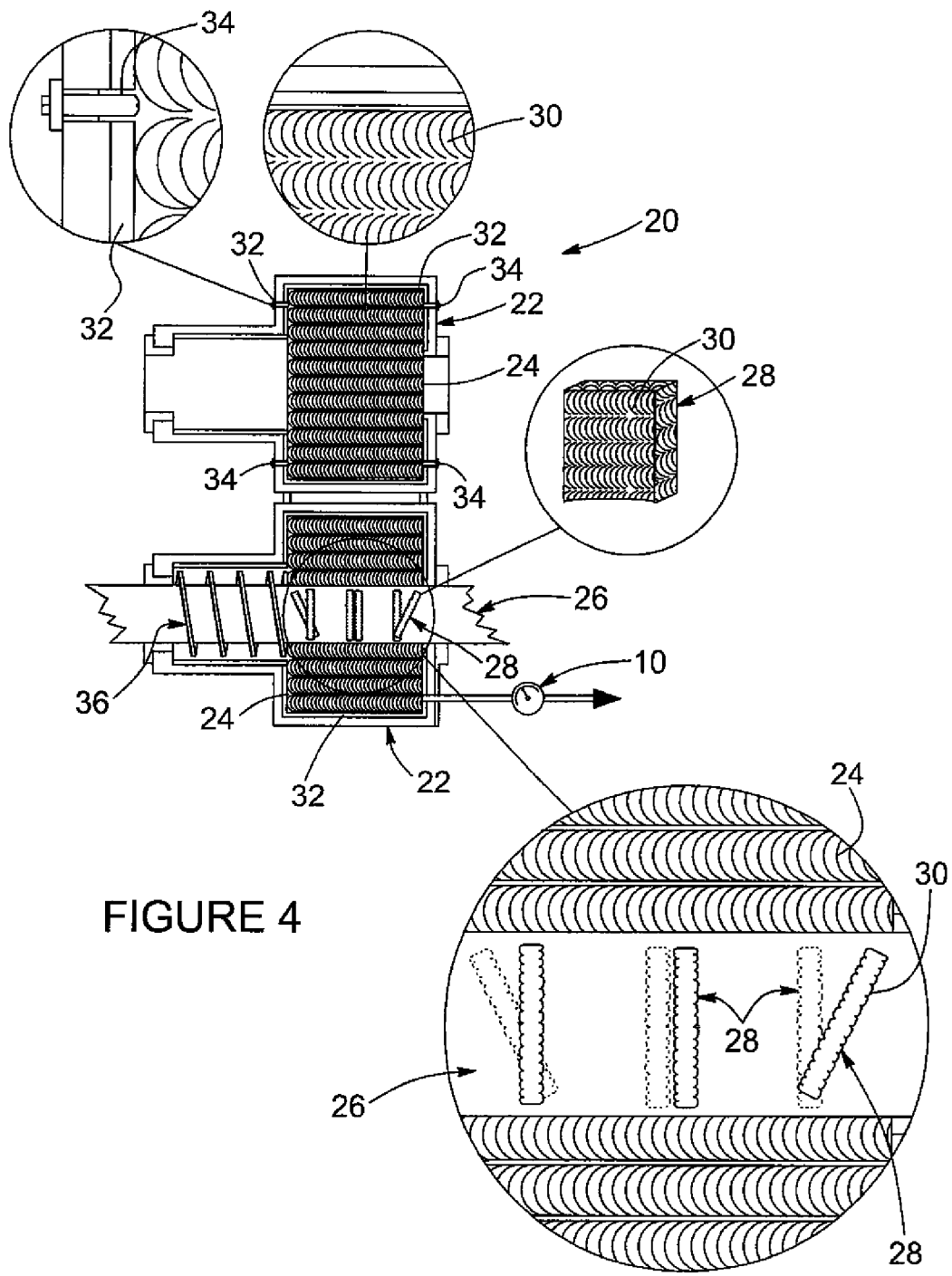
FIG. 4 illustrates a thermokinetic mixer according to a preferred embodiment of the invention.
Figure 5:
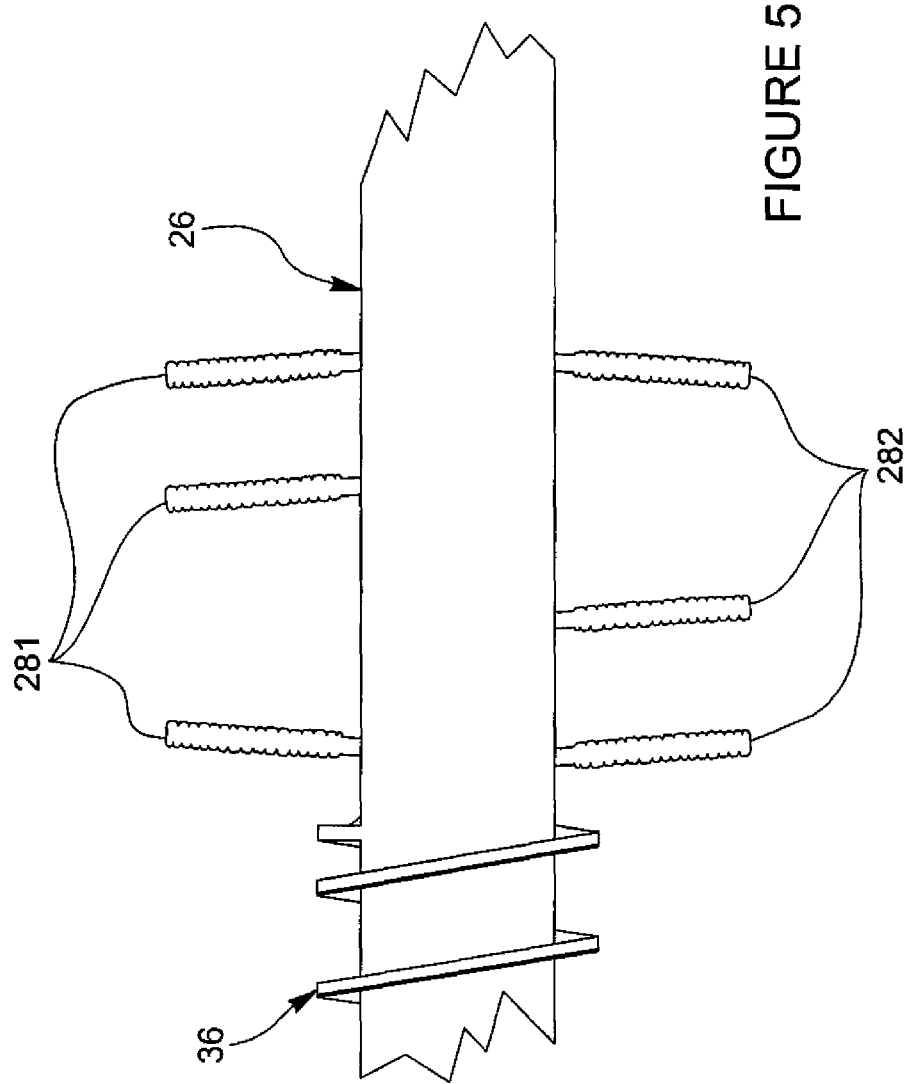
FIG. 5 is a partial view of the shaft and blades of the thermokinetic mixer illustrated on FIG. 4.

According to another aspect of the intention, there is provided a thermokinetic mixer, also known and named herein K-mixer, as the one illustrated in FIGS. 4 and 5.

Figure 3:
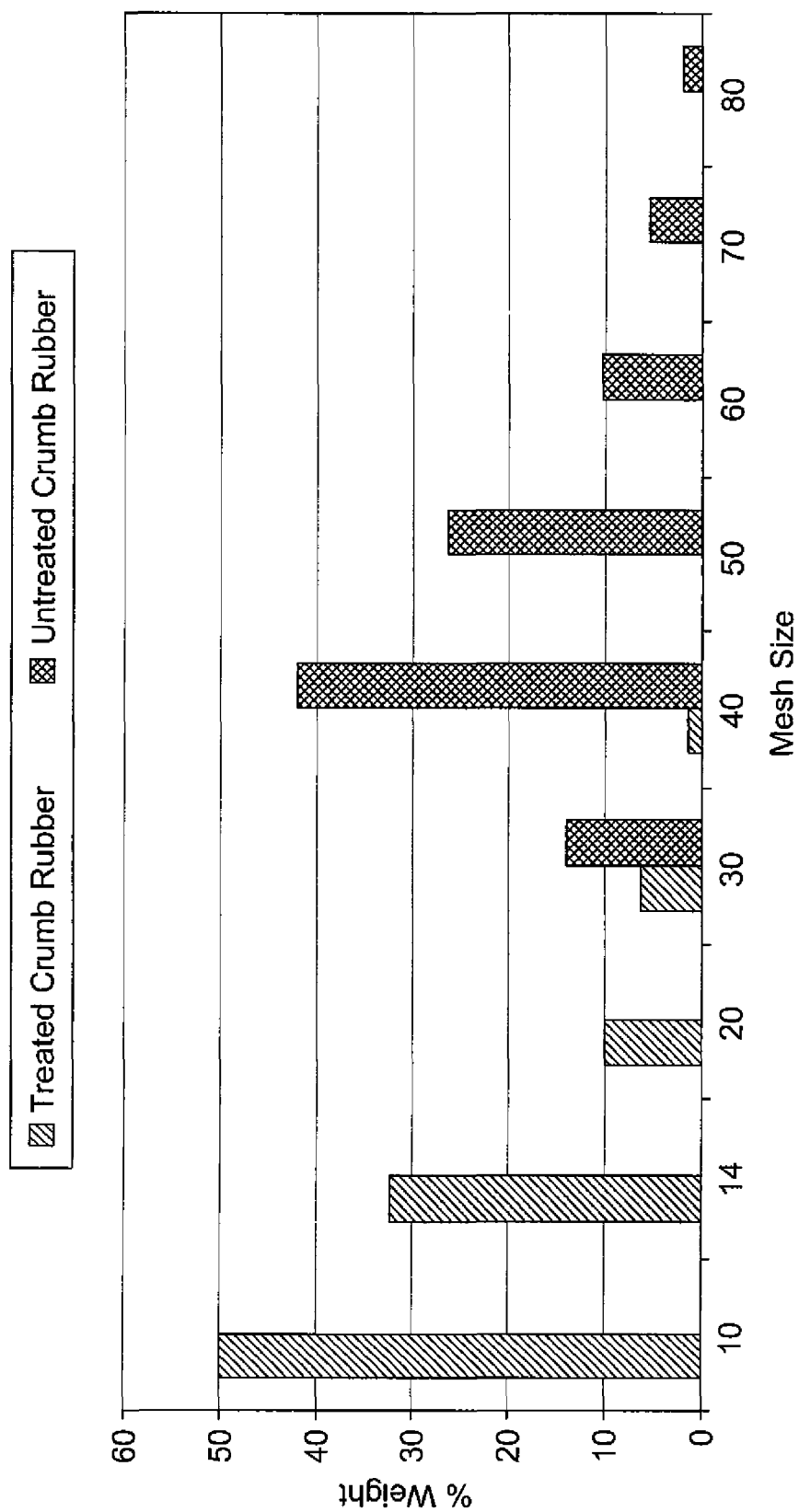
FIG. 3 is a graphic comparing the sieve analysis (mesh size) for untreated (vulcanized) and regenerated crumb rubber obtained by a preferred embodiment of the method of the invention.

The thermokinetic mixer (20) is particularly adapted for the regeneration, or devulcanization, of ground vulcanized rubber (also called crumb rubber) with a particle size from about 10 mesh to 200 mesh (2000 to 74 microns), preferably from about 30 to 100 mesh (595 to 149 microns). As shown in FIG. 3, the vulcanized crumb comprise different sized crumb with a distribution centred on about 40 mesh (388 microns).

The K-mixer (20) comprises an air tight stationary chamber (22). On FIG. 4, the chamber (22) has been represented in an open configuration in order to see the inner non-uniform surface (24) of the chamber (22).

The K-mixer (20) also comprises a rotor shaft (26) co-axially extending into the chamber (22) having blades (28) extending from the shaft (26) towards the inner surface (24) of the chamber.

The shaft illustrated on FIG. 5 has six blades (281, 282) which is the typical number of blades for a 40 liter capacity K-mixer (available volume of the chamber). The blades may be unevenly located on the shaft. The dimensions of the blades, their relative positions and form can be modified in order to keep the crumb material moving around the shaft inside the chamber, ensuring as such a uniform temperature distribution throughout the rubber batch treated into the K-mixer. As aforesaid, the form of the blades can be changed, for example by longitudinally twisting the blades (such as the blades of a boat propeller).

As also illustrated in FIG. 4 (close-up) and FIG. 5, the blades (28, 281, 282) can be in a non-parallel relationship one to another; with three blades (281) on one side of the shaft (26) and three other three blades (282) on the opposite side of the shaft (26).

For the regeneration of rubber, as the one described in the present description, the rotor shaft (26) and blades (28) of the K-mixer (20) have a controlled rotational speed that may vary starting from about 400 rpm to about 1400-2000 rpm. Of course, a rotational speed outside this specific range can be used if necessary, and the invention is not limited to this illustrative rotational speed range. The radius is approximately 20.3 cm (8 inches) for the aforementioned rpm's.

The particularity of the K-mixer of the invention resides in that the chamber (22) surrounding the rotor shaft (26) has an inner non-uniform surface (24). Preferably, each blade (28) has also an outer non-uniform surface (30).

As illustrated in FIG. 4, the inner surface or wall (24) of the K-mixer and/or the outer surface of the blades may be textured or embossed. They may be lined with hardened steel in the form of welded beads which create a beaded non-smooth surface (24, 30). Additionally, the surface can be machined to simulate a beaded non-smooth surface.

These non-smooth surfaces (24, 30) increase the surface contact between said surfaces and the crumb rubber, allowing better impacts and temperature distribution or diffusion into the crumb rubber.

The K-mixer preferably further comprises a cooling device (32) under the inner surface (24) of the chamber. The cooling device is adapted to cool down the temperature of the inner surface (24) when the shaft (26) and blades (28) are rotating. As an example of a cooling device, water jackets (32) can be used to cool the inside surface of the mixer at the correct rate and within the required time limits over consecutively processed batches.

The thermokinetic mixer (20) of the invention may also comprise at least one coolant injection device (34) adapted to inject or spray a cooling agent, such as water, into the chamber to cool down the rubber powder while the K-mixer is rotating. As illustrated in FIG. 4 (close-up), each injection device can be a nozzle (34) adapted to spray water into the chamber in a form of a mist or a jet stream. The number of water injection devices and the specific location thereof are not limited to the four nozzles illustrated in FIG. 4.

The chamber (22) of the thermokinetic mixer (20) of the invention is also air tight to avoid rubber combustion during the process. Preferably, the mixer (2) further comprises a vacuum pump (10) connected with the chamber (22) for removing air, i.e. oxygen, from the chamber. In the absence of a vacuum pump, the entry would be used as a vent for the air tight chamber.

Furthermore, the volume of the K-mixer (20) can be adjusted accordingly with the associated production and process capacity requirements. More than 50% of the K-mixer (20) available volume should be occupied by the material to be treated to allow internal impacts and frictions between the crumb rubber. Preferably from 50 to 90%, and more preferably a third of the volume (about 67%) should be occupied. Typically, the K-mixer should be increased in width while maintaining as much as possible the diameter of the rotor and blades such that the desired volume is achieved. For example, a 40 L K-mixer is of about 30.5 cm (12 inches) in length and about 43.2 cm (17 inches) in diameter (internal dimensions).

According to another aspect of the invention, there is provided a device assembly for regenerating a vulcanized rubber.

As illustrated on FIG. 1, the device assembly comprises a first mixer (5) for mixing crumb rubber and the lubricant at room temperature (step a) of the method), and also a K-mixer (20) of the invention such as the one described above and illustrated on FIG. 4.

The device assembly also comprises a transfer device (9) for transferring the mixture from the first mixer into the K-mixer (7 on FIG. 1, or 20 on FIG. 4), such as SAS (loading and isolating compartment). Preferably, the transfer is also air tight in order to avoid possible air transfer into the K-mixer chamber (22).

As illustrated in FIGS. 4 and 5, the transfer from the transfer device (9) to the chamber (22) may be done using a worm drive or screw drive (36) preferably located around the shaft (26) at the entrance of the K-mixer (2).

The invention is then also directed to the use of the regenerated crumb rubber obtained by the method detailed above, for the making of rubber articles (such as new tires, rubber floor, rubber shoes, etc) or as a filler for the making of plastic composite material. Therefore, according to another aspect of the invention, there is provided a process for making vulcanized rubber comprising the steps of:

adding a mixture comprising regenerated crumb rubber obtained by the method as defined above and an adequate amount of a vulcanization agent, to a virgin rubber polymer to be vulcanized; and submitting the mixture and virgin rubber polymer to vulcanization in order to obtain the vulcanized rubber.

Preferably, the process further comprises the step of adding to the virgin rubber polymer one or more vulcanization additives well known in the art, such as activators, amides, coated metal oxide, coated sulphurs, coupling agents, homogenizing agents, mandrel release, mold cleaner, peptizers, plasticizers, polyethylene waxes, processing or dispersing agent (for example those provided under the trademark Struktol®).

Preferably, in the process above, the mixture comprising regenerated crumb rubber and vulcanization agent is added to the virgin rubber polymer before the addition of the vulcanization additive(s).

The virgin rubber polymer may be a virgin rubber polymer based compound. By "virgin polymer based compound", it is meant that the virgin rubber polymer is already mixed with at least one vulcanization agent and/or additives. The based compound is thus processed with the regenerated crumb/vulcanization agent mixture (see for example, Table 6)

Preferably, the vulcanization agent is in a powder form or is previously contained in a liquid, such as a CBS accelerator (CBS is N-Cyclohexyl-2-benzothiazyl sulphonamide) which includes sulphur. The vulcanization agent(s) used in the process above can be any vulcanization agents known in the art of rubber vulcanization, which preferably comprise sulphur. Other vulcanization agents of the art can be used, such as peroxides, urethane crosslinkers, or metallic oxides.

Sulphured vulcanization agents can be used in a concentration from about 1% to about 10% by weight of the regenerated crumb rubber and approximately from about 1 to 3 phr (parts per hundred of rubber), preferably about 1.5 phr, of the virgin rubber polymer. These concentrations will vary with the application.

In function of the applications, the volume of regenerated crum rubber used in the vulcanization process may be from 3 to 99%.

However, for the first time, the method of the invention has allowed making regenerated crumb rubber with a mesh size of about 10 to 40 mesh (see FIG. 3). Accordingly, 100% of regenerated crumb rubber may be used in a vulcanization process for the making of certain rubber goods.

The invention is thus also directed to any rubber goods comprising vulcanized rubber made by vulcanization of 100% of regenerated crumb rubber obtained by the method of regenerated vulcanized rubber defined above.

When the regenerated crumb rubber is mixed with the compound which includes the virgin rubber polymer, the vulcanizing agent, such as sulphur, will migrate to the regenerated crumb rubber during vulcanization, leading to a poor regeneration degree since an insufficient quantity of vulcanizing agent reacted with the virgin polymer. This vulcanizing agent migration is avoided by adding another adequate amount of vulcanization agent to the regenerated crumb rubber, before mixing the regenerated and virgin rubbers.

The virgin rubber polymer comprising the regenerated crumb may be subjected to any vulcanization of rubber known in the art.

EXPERIMENTAL SECTION

Example 1

Preparation and Characterization of Regenerated Crumb Rubber

The first step in the manufacturing of regenerated rubber is grinding of the rubber part to be reclaimed. Then metal impurities that may be present in the rubber from scrap can be removed, such as by using a magnet, to avoid potential damage to the equipment.

Furthermore, the material should be "fluff free" from the supplier. "Fluff" is the polyester fibre or nylon that sometimes is not removed from untreated crumb rubber.

Once ground, the untreated rubber has a typical mesh size distribution for vulcanized crumb rubber from 30 to 80 mesh, as reported in Table 1 below and on the graphic of FIG. 3.

In the present description of a specific example of the invention, the letter U symbolized the term "untreated", SBR means "Styrene Butadiene Rubber", while the symbol T is used for a treated/regenerated/devulcanized rubber by the method of the invention. The U-SBR mentioned in Table 1 represents an untreated crumb rubber from truck tire tread used as raw material in the example.

TABLE 1

Particle size distribution for untreated and treated SBR crumb:

| Mesh | U-SBR (% weight) | T-SBR (% weight) |
|---|---|---|
| 10 | 0.0 | 50.0 |
| 14 | 0.0 | 32.5 |
| 20 | 0.0 | 10.0 |
| 30 | 14.1 | 6.3 |
| 40 | 42.0 | 1.4 |
| 50 | 26.4 | 0.0 |
| 60 | 10.2 | 0.0 |
| 70 | 5.4 | 0.0 |
| 80 | 1.9 | 0.0 |

In the present example, the selected lubricant is a vegetable oil mixed with the raw material in the amount of about 5 wt. % (i.e. if 100 lbs of crumb rubber are treated, then 5 lbs of oil are added for a total of 105 lbs). Oil and crumb rubber are uniformly mixed during about 4 minutes, using a low speed mixer Model SPC-3696™ from MARION MIXERS INC.

Once oil and crumb rubber have been mixed, a mixture load is dropped in a SAS that then feeds the high-speed mixer. The load of the SAS may vary between 22 lbs and 200 lbs. Of course, the SAS load is dependent on the capacity of the thermokinetic mixer. For instance, the thermokinetic mixer used in the present example has a 40 L capacity and is equipped with variable frequency electric speed control.

The first mixer is positioned above a SAS which is positioned above the K-mixer. The U-SBR falls by gravity through the SAS and then conveyed to the K-mixer thanks to a worm drive (also called a screw drive). Once treated, the corresponding treated material (T-SBR) exits the K-mixer and goes into a tumbler drum to finish cooling.

Figure 2:
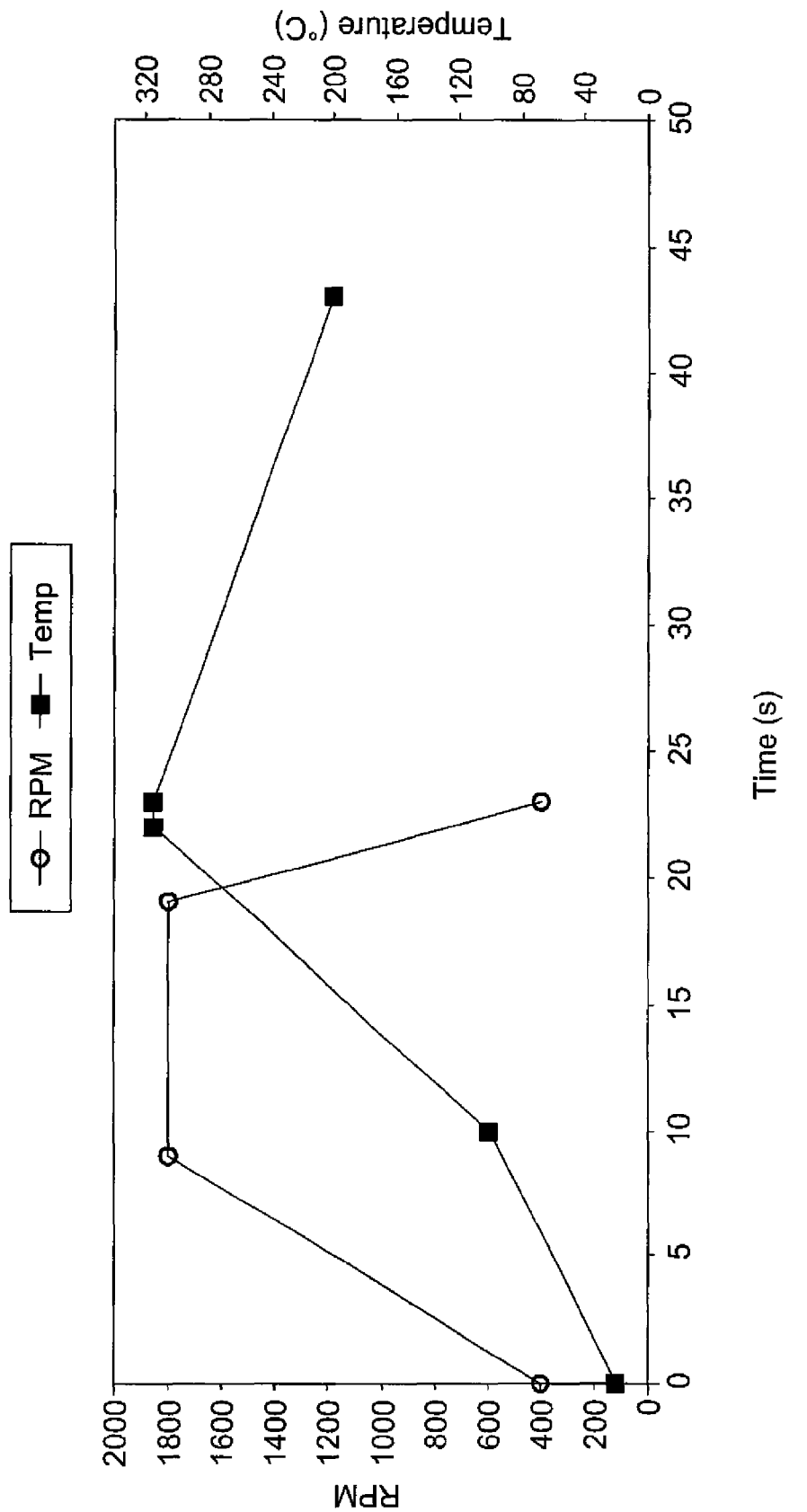
FIG. 2 is a graphic illustrating the variation of temperature (° C.) in the thermokinetic mixer (also named herein after "K-mixer") and K-mixer shaft speed (rpm) as a function of time (seconds) according to preferred embodiments of the invention.

As illustrated in FIG. 2, the material in the K-mixer follows a specific temperature profile. The temperature starts at room temperature (i.e. in the present example a temperature of about 20° C.), rising to approximately 315° C. within about 22 seconds, remains constant for 0.25-3 seconds before cooling down to 200° C. As indicated, the time to go through each of these temperature phases in the K-mixer is very short.

As illustrated in FIG. 2, the K-mixer allows the fast rising of temperature thanks to the speed variation of its rotor blades which is controlled to preferably vary between 400 rpm and 1800 rpm. The speed of the shaft and blades are increased from 400 rpm to about 1800 rpm within a period of time of about 10 seconds. Then the speed remains constant for about 10 more seconds. Finally, the speed is drop down to 400 rpm within about 5 seconds, and remains constant until the regenerated crumb exit the K-mixer.

As further shown in FIG. 2, the temperature keeps increasing even though the shaft's speed has been dropped down to 400 rpm. Then, the temperature remains constant for about 0.25 to 3 seconds before decreasing to a lower temperature around 200° C. The decrease in temperature lasts about 20 seconds in this example.

The whole step takes place in less than about 60 seconds, preferably less than 45 seconds, which is particularly interesting for mass-production of regenerated crumb rubber with lower energy consumption.

The K-mixer and its content are cooled down by dropping the shaft's rotational speed, and also by injecting water in the form of a mist at different points in the chamber of the K-mixer, for example by using sprayers. The water is instantly transformed in vapour that exits the K-mixer via the vacuum pump, carrying the oil, sulphur and other impurities out of the material. As a proof of the rubber devulcanization or desulphurization taking place in the K-mixer, these vapours exiting the K-mixer have a strong smell of sulphur which can be eliminated with the use of a scrubber.

The K-mixer is also equipped with a cooling jacket surrounding the chamber, in which cold cooling agent is circulated for cooling the chamber, allowing processing the material with the required decreases in temperature. Both cooling jacket and sprayers can be used conjointly to cool down the chamber.

The treated SBR exits the K-mixer into a drum tumbler in which it is further cooled down from approximately 140° C. to 30° C. in about 10-45 seconds. This final cooling phase allows the material to expand as required. Furthermore, the drum tumbler may be used as a sieve for removing the smaller crumb rubber, for example 40 mesh and less, since they may be considered as impurities Then, the crumb rubber may be further cooled down to room temperature (about 20° C.) prior to being packaged.

Several characterizations are presented to discuss on the mechanical-chemical properties of the recycled SRB and on the effect of the regeneration method of the invention. Two SBR powders were received and tested: untreated crumb SBR is here also referred as U-SBR and regenerated crumb rubber as T-SBR.

Granulometry is measured with a set of 9 sieves with different apertures: 10, 14, 20, 30, 40, 50, 60, 70, 80, and 90 minus (smallest crumb in pan) mesh sizes. About 180 g of material was sieved during 10 min in a Ro-Tap® automatic sieve shaker.

Solid density is measured with an Ultrapyc™ 1200e gas pycnometer using pure nitrogen as the working gas. The tests were made in a 10 cm$^3$ chamber at room temperature (23° C.).

Acetone extract is measured according to ASTM-D297 (Standard Test Methods for Rubber Products-Chemical Analysis, http://www.astm.org/Standards/D297.htm). Acetone was eliminated using a rotary evaporator followed by drying the residues to constant weight (overnight) in a controlled temperature oven at 85° C. Acetone extract was calculated as in formula (1):

$$a\ \% = \frac{R}{M} \times 100 \qquad (1)$$

with a %=acetone extract (%), R=weight of residue (g) and M=weight of sample (g).

Volatile content is measured with an A&D MF—50® moisture balance model according to ASTM D1278 (http://www.astm.org/Standards/D1278.htm). Two tests were performed: Volatile content at 100° C. allowing the determination of moisture (water) and other light-volatile components, and volatile content at 160° C. allowing the determination of oil content. The volatile content is obtained via the formula (2):

$$V\ \% = \frac{M - R}{M} \times 100, \qquad (2)$$

where: V %=volatile content (%), M=initial weight of sample (g), R=final weight of sample (g).

The regeneration degree (or devulcanization degree) of any crosslinked rubbers is usually determined by the interaction between the polymer and a solvent. The amount of solvent that will penetrate into the structure is a function of the solvent-polymer affinity and the amount of free space available which is related to crosslink density. The more free space allows for more solvent penetration (or swelling) which is directly related to the reduction in crosslink density. The basic principle is to determine the crosslink density before and after treatment in accordance with the ASTM D6814 (Standard Test Method for Determination of Percent Devulcanization of Crumb Rubber Based on Crosslink Density, available at http://www.astm.org/Standards/D6814.htm). This protocol was respected but modified to deal with the conditions imposed by working with crumb rubber.

The regenerating degree (RD) is defined as the sample (treated) crosslink density variation relative to the control sample (untreated) crosslink density as:

$$RD = \left(1 - \frac{v_s}{v_r}\right) \times 100 \qquad (3)$$

where the crosslink densities of the treated sample ($v_s$) and of the untreated control sample ($v_r$) are obtained using the Flory-Rehner equation known in the art.

Since the ASTM D6814 method was developed for rubber blocks or slabs, it cannot be easily applied on small crumb (powders). In order to overcome these inconveniences, some modifications to the procedure must be done (A. Macsiniuc, A. Rochette, D. Rodrigue, "Understanding the regeneration of EPDM crumb rubber from used tires", Progress in Rubber Plastics & Recycling Technology, 26, 2, 51-81, 2010):

A) After the extraction and first drying steps, around 2 g of sample is transferred in a weighed vial. The amount can be adjusted to fill less than ¾ of the vial's volume. Next, the vial is complexly filled with toluene. Every 24 h, the toluene is changed. After a total of 72 h, the excess toluene is eliminated by filtration and the swollen sample, which remained in the vial, is quickly weighed and dried for 24 h at 85° C. in an oven. Finally, the dried sample is weighed. Repeated weighing of the vial at determined time intervals allowed the determination of the retained toluene mass ($m_s$) and sample mass ($m_r$) at equilibrium. To determine the powder's density, the gas pycnometer was used.

B) For each material, three replicates are analyzed. The regeneration degree is calculated using the average crosslink densities for each SBR powder. The standard deviation is determined via (D. A. Skoog, D. M. West, F. J. Hooler, *Chimie Analytique*, De Boeck, p. 35 (2002).):

$$SD_{RD} = RD \times \sqrt{\left(\frac{SD_{v-sample}}{v_{sample}}\right)^2 + \left(\frac{SD_{v-control}}{v_{control}}\right)^2} \qquad (3)$$

Where $SD_{v-sample}$ is the standard deviation obtained for the sample's crosslink density ($v_{sample}$) and $SD_{v-control}$ is the standard deviation obtained for control sample's crosslink density ($v_{control}$).

Untreated crumb rubber, U-SBR, was used as the control sample.

Thermogravimetry analysis (TGA) or Differential Thermogravimetry analysis (DTGA) provide some information about the rubber thermo-stability. Comparison between TGA-DTGA curves obtained from replicas can also provide information about material homogeneity. The results give information about possible composition modifications. TGA data were gathered on a TA Instruments model Q5000™ between 50 and 650° C. using platinum pans with a temperature ramp of 5° C./min in air at a flow rate of 25 ml/min.

Ash content is indirectly provided by the TGA analysis. The value is obtained by difference between the 100% of the sample minus the final mass loss % after calcination as:

$$\text{Ash content}(\%) = 100\% - \text{total mass loss}(\%) \quad (4)$$

Because the TGA analysis was conducted at a temperature 100° C. higher than the value prescribed by ASTM D297 and TGA analysis use smaller samples (about 13 mg) there is the possibility of low representativeness. To ensure the results accuracy, the ash content was also determined using the ASTM D297 method. In this case, larger samples were used (1-1.4 g initial mass) and calcinations was performed in an oven at 550° C. for 90 min.

Particle morphology is determined with optical stereomicroscope (Olympus™ SZ-PT) and in a scanning electronic microscope (JEOL JSM 840A™). Different magnifications were used for powders and moulded samples.

Specific surface area is determined by nitrogen adsorption isotherms using the BET method on a TriStar 3000™ unit. Samples of around 0.28 g were used.

especially M2 will permit the development of new products using 100% regenerated material with suitable levels of sulphur and accelerator.

In Table 2:
(1) Accelerator: CBS (N-Cyclohexyl-2-benzothiazyl sulphonamide) is a delay action accelerator. Respected a conventional cure (0.57% accelerator: 2% sulphur)
(2) Cure characteristics were obtained using a 25% loading of REGEN-T01 in a re-tread compound. Results will vary with different percent loading of REGEN-T01 in a compound.
(3) Mechanical Properties: The original standard was developed for devulcanized sheets while this specification featured adjustments required for the realities of working with regenerated crumb rubber. Material mechanical properties were obtained for 100% REGEN-T01. Part thickness was 3 mm to ensure that testing sample is free of voids caused by small displacements of crumb in the mold. The test slab part was cured at 160°

TABLE 2

Treated Rubber Specification (100% Truck Tread):

| Parameter | | | Specification | | |
|---|---|---|---|---|---|
| Samples | Units | Test Method | M1 | M2 | Ratio (M2/M1) |
| Sulphur (% Added by sample weight) | (%) | NA | 2% | 2% | |
| Accelerator[1] (CBS) (% Added by sample weight) | (%) | NA | None | 0.57% | |
| General | | | | | |
| Raw Materials | | NA | Truck tire tread & Process oil | Same | |
| Product Nature | | NA | Powder form | Same | |
| Colour | | NA | Black | Same | |
| Packaging | | NA | As per client requirements | Same | |
| Chemical Content | | | | | |
| Volatile Matter | % | ASTM D1278 @100° C. | Typical 0.62; <0.8 | Same | |
| Rubber Hydrocarbon | % | ASTM D1278 | 48 ± 8 | Same | |
| Acetone Extract | % | ASTM D1278 | 13.3 ± 1.3 | Same | |
| Cure Characteristics[2] | | | | | |
| ML | lbf · in | ASTM D2084 | 52 | Same | |
| MH | lbf · in | ASTM D2084 | 74 | Same | |
| $TS_{2pt\ rise}$ | minutes | ASTM D2084 | 1.0 ± 0.5 | Same | |
| $TC_{90\%\ cure}$ | minutes | ASTM D2084 | 15.5 ± 0.5 | Same | |
| Mooney Viscosity | ML (1 + 4) @ 100° C. | ASTM D1646 | 60 ± 5 | Same | |
| Mechanical Prop.[3] | | | | | |
| Mesh Size | Mesh | ASTM D5644 | 10 50.0%; 14 33.3%; 20 9.4%; 30 7.3%; 40 0.0% | Same | |
| Specific Gravity | | ASTM D297 | 1.06 ± 0.01 | Same | |
| Hardness | Shore A | ASTM D2240 | 58 ± 1 | 61 ± 1 | 1.05 |
| Modulus | psi | ASTM D412 | 100% 309 ± 6 | 100% 416 ± 3 | 1.35 |
| | | | 200% 676 ± 21 | 200% 948 ± 14 | 1.40 |
| Tensile Strength | psi | ASTM D412 | 742 ± 100 | 1002 ± 73 | 1.35 |
| Elongation at Break | % | ASTM D412 | 220 ± 26 | 211 ± 13 | 0.96 |
| Tear, die C | pli | ASTM D624 | 131 ± 28 | 144 ± 23 | 1.10 |
| Regeneration Degree[4] | % | ASTM D6814 (modified) | 61 ± 16 | Same | |

Table 2 presents an example of typical uncompounded material mechanical properties of 100% treated material mixed with 2% sulphur by weight (M1) and additionally in the form of a conventional cure with an added 0.57% of CBS accelerant (M2). The high tensile properties for both M1 and C. for 8 minutes. The part pressure was 2,000 psi since we must compress and cure the part.
(4) Regeneration Degree: ASTM D6814 is modified in order to account for the issues related to handling crumb rubber.

Crumb Size/Diameter Distribution:

Data in Table 1 above also reported in FIG. 3, show that the treated T-SBR has larger sieve diameters (weighted average around 14 mesh) that the untreated SBR (weighted average around 40 mesh).

Specific Surface Area:

Data in Table 3 below demonstrates that the treated SBR can have approximately 5 times more surface available per unit weight than the untreated SBR. From a solid perspective, the treatment increases substantially the possible contact area between the SBR crumb and the matrix in which they will be included.

TABLE 3

| Specific surface area of regenerated SBR: | | |
|---|---|---|
| Specific surface area | Regenerated rubber | Raw rubber |
| $m^2/g$ | 1.92 | 0.39 |

Figure 6:
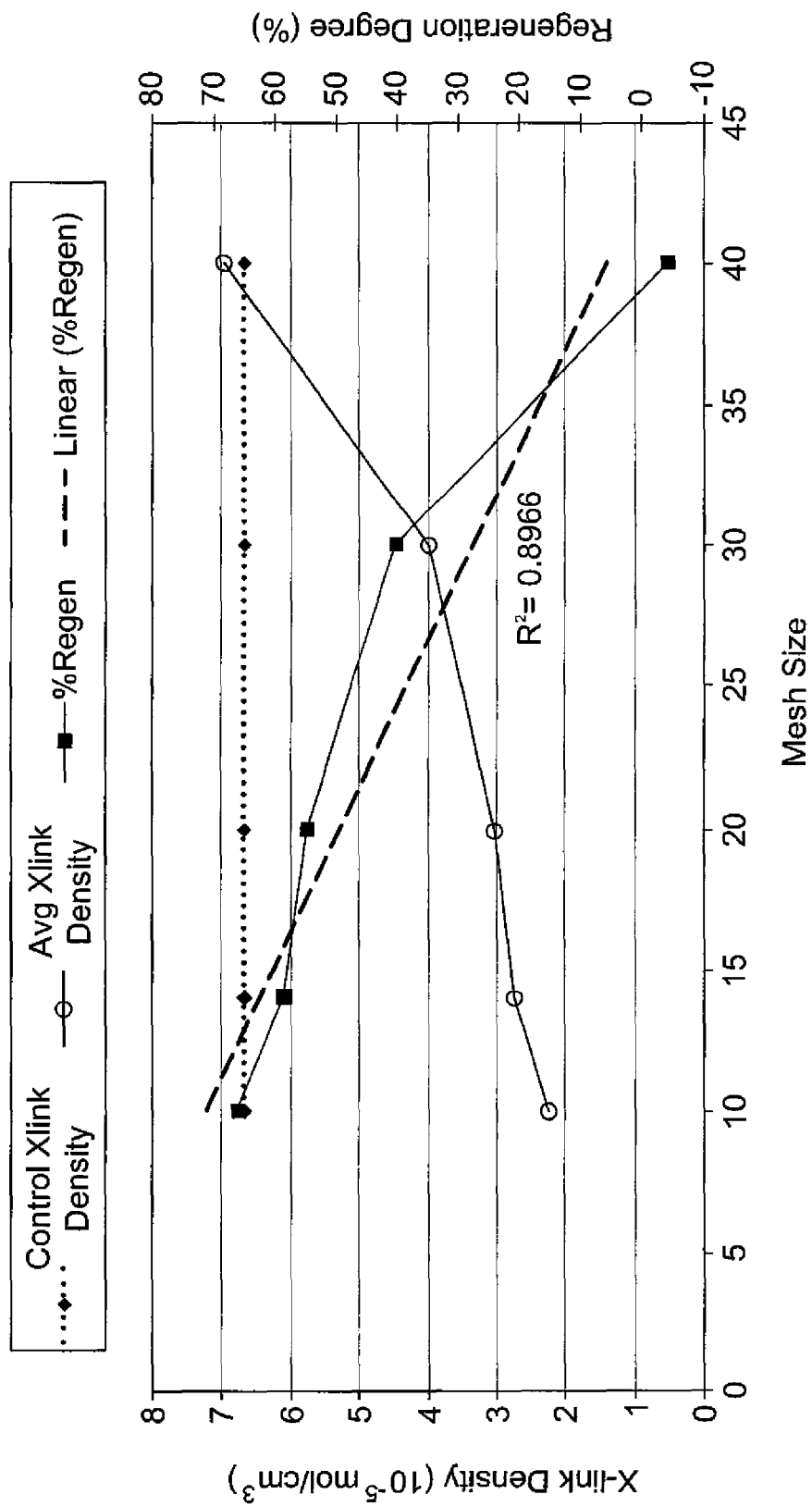
FIG. 6 is a graphic illustrating the variation of the crosslink (X-link) density (in $10^{-5}$ mol/cm$^3$) and regeneration degree (%) of processed rubber as a function of the mesh size.

Devulcanization:

In terms of devulcanization, the results of the modified ASTM D6814 (called the regeneration degree here) are shown in Table 4 below and transferred in FIG. 6. Based on the analysis performed, both SBR have significantly different crosslink densities with the treated one having a lower value than the untreated SBR. In this case, the treatment produced a 61% regeneration degree (RD %) when the 40 mesh treated material was removed (in this trial, after treatment the 40 mesh was on average, slightly revulcanized). There is a clear relation between mesh size and the degree of regeneration ($R^2$=0.90). Conceptually, the larger the diameter of the treated crumb then the greater the regeneration degree.

TABLE 4

| Results of the devulcanization tests | | | | | | | | | | | | | |
|---|---|---|---|---|---|---|---|---|---|---|---|---|---|
| | Control Xlink Density | | | Regeneration | | | | | % Regen | | All mesh sizes | | Remove 40 mesh |
| Mesh | Diam. (in) | ($10^{-5}$ mol/$cm^3$) | N | Avg Xlink Density | SD | 2SD | (% Avg) | % Regen (%) | SD (%) | % Wt (%) | | E(x) (%) | % Wt | E(X) (%) |
| 10 | 0.079 | 6.67 | 4 | 2.246 | 0.2238 | 0.448 | 19.9% | 66.3% | 3.36% | 48.0% | | 31.8% | 50.0% | 33.2% |
| 14 | 0.056 | 6.67 | 4 | 2.749 | 0.1342 | 0.268 | 9.8% | 58.8% | 2.01% | 32.0% | | 18.8% | 33.3% | 19.6% |
| 20 | 0.033 | 6.67 | 4 | 3.020 | 0.4424 | 0.885 | 29.3% | 54.7% | 6.63% | 9.0% | | 4.9% | 9.4% | 5.1% |
| 30 | 0.023 | 6.67 | 4 | 3.977 | 0.3004 | 0.601 | 15.1% | 40.4% | 4.50% | 7.0% | | 2.8% | 7.3% | 2.9% |
| 40 | 0.017 | 6.67 | 5 | 6.939 | 0.5512 | 1.102 | 15.9% | -4.0% | 8.26% | 4.0% | | -0.2% | | |
| | | Total | 21 | | | | | | | 100.0% | wAvg 58% | | 100.0% | 61% |

Based on the results obtained, differences were observed between the treated and untreated SBR crumb. In general, the regenerated SBR has higher density, specific surface area, acetone extract content and sieve diameter. On the other hand, it has a lower crosslink density indicating devulcanization (about 61% less crosslinks) and larger diameters (mesh size was centred at 40 prior to treatment and 14 after treatment).

The regenerated or treated crumb rubber obtained according to the process of the invention can now be used as virgin rubber for different sorts of applications.

For example, the regenerated rubber can be mixed with another compound due to its ability to form new cross links and increased surface area (larger bonding surface).

A "green" additive may also be added that would further increase the compatibility of the treated crumb rubber with a second compound. As known in the art, this additive would further encourage the attractiveness of the regenerated rubber with the second compound.

Example 2

Vulcanization Process Including Regenerated Crumb Rubber

In table 5 below is detailed an example of vulcanization of rubber (virgin and regenerated). A Banbury mixer, for example, can be used for the process.

TABLE 5

| (steps of the process) | | |
|---|---|---|
| Steps | Mixing Time (min) | Mixing Instructions |
| 1 | 0.0 | Adding virgin rubber at 55 rpm of mixing |
| 2 | 0.5 | Mixing at speed of 77 rpm |
| 3 | 1.5 | Mixing with regenerated crumb with sulphur (ex: 2% added by weight) at speed of 55 rpm |
| 4 | 2.5 | Adding ⅔ carbon black + Struktol ® additives such as process aid at 55 rpm float ram - 30 seconds then ram pressurized[1]. |
| 5 | 4.0 | Sweeping and adding remainder of the black + zinc oxide at 55 rpm float ram - 30 seconds then ram pressurized. |
| 6 | 5.5 | Sweeping and adding other additives except the curatives - 55 rpm |

TABLE 5-continued

| (steps of the process) | | |
|---|---|---|
| Steps | Mixing Time (min) | Mixing Instructions |
| 7 | 6.0 | Sweeping at speed 77 rpm |
| 8 | 7.0 | Drop batch - speed 55 rpm |

[1]The time of floating the ram is not counted as mix time because with no pressure there is little or no mixing. It is only to allow for blending of the powder and the masticated rubber.

The order of the mixing detailed in Table 5 gives a better result compared to the addition of the regenerated rubber the should be respected for the regenerated crumb rubber (see step 3). In step 3, required weight of regenerated crumb is added with pre-mixed sulphur as a percentage of total weight to obtain required loading. For example, for 85 lbs of mixed compound (polymer, carbon black and additives) add 15 lbs of our regenerated crumb (with pre-mixed sulphur) and mix to get 15% loading by weight (total weight is 100 lbs).

Changing the mixing protocol can noticeably produce varying compound properties and it also represents an opportunity to improve results.

The compound that includes the new treated crumb rubber and sulphur mix is ready to be vulcanized into a part. For example, 2 mm test plaques can be made by compressing the material at 774 psi for 30 minutes at 145° C. Parts made in industry will use varying pressures, duration, part geometry and temperature during the molding process.

Two comparative examples of the vulcanization process are given In Table 6 below in accordance to the addition or not of regenerated crumb rubber to the virgin rubber polymer.

As shown in Table 6 below, the addition of 15% of regenerated rubber allows reducing the amount of virgin rubber polymer based compound to be used, and consequently the amount of vulcanization additives included in the based compound.

TABLE 6

| Compound Components | Virgin rubber polymer only (% Weight) | Virgin rubber polymer and regenerated crumb rubber (% Weight) |
|---|---|---|
| Regenerated crumb rubber (including to 2% of sulphur) | 0 | 15 |
| Virgin rubber polymer based compound, comprising: | | |
| Virgin rubber polymer | 47.3 | 40.2 |
| Oil/plasticizer | 10.4 | 8.8 |
| Carbon black | 35.4 | 30.1 |
| Zinc oxide | 1.4 | 1.2 |
| Stearic acid | 0.5 | 0.4 |
| Antidegradants | 1.4 | 1.2 |
| Process aids (Struktol ®) | 1.9 | 1.6 |
| Curatives | 1.7 | 1.4 |
| Sub Total | 100 | 85 |
| Total | 100 | 100 |

Table 7 below presents compounded material mechanical properties for the material mixed in a typical retread tire compound at 15% loading by weight. These results demonstrate that the compound filled with the treated material (15% by weight) has better or similar mechanical performance given by: hardness, modulus (100%, 200%, 300%), tensile strength, elongation at break and tear. Adjustments to levels of sulphur in the regenerated crumb and the sulphur present in the compound significantly shift the mechanical properties.

TABLE 7

Compound specification

| Parameter Samples | Units | Test Method | Specification | | Ratio (C15/CC) |
|---|---|---|---|---|---|
| | | | Control Compound (CC) | C15 | |
| Loading of Devulcanized Crumb Rubber | % wt | | 0% | 15% | |
| Sulphur in Devulcanized Crumb Rubber (% Added by sample weight) | % wt | NA | 0% | 2.0% | |
| Sulphur in Virgin Compound | phr | NA | 1.5 | 1.5 | |
| Cure Characteristics | | | | | |
| ML | lbf · in | ASTM D2084 | 9.62 | 9.20 | 0.96 |
| MH | lbf · in | ASTM D2084 | 36.39 | 32.46 | 0.89 |
| $TS_{2pt\,rise}$ | minutes | ASTM D2084 | 12.77 | 7.01 | 0.55 |
| $TC_{90\%\,cure}$ | minutes | ASTM D2084 | 23.61 | 15.49 | 0.66 |
| Mooney Viscosity | ML (1 + 4) @ 100° C. | ASTM D1646 | 48.63 | 66.12 | 1.36 |
| Scorch Time | minutes | ASTM D1646 | 23.17 | 23.83 | 1.03 |
| Mechanical Properties[1] | | | | | |
| Hardness | Shore A | ASTM D2240 | 66 | 70 | 1.06 |
| Modulus | psi | ASTM D412 | 100% 342 ± 5 | 100% 358 ± 21 | 1.05 |
| | | | 200% 715 ± 13 | 200% 731 ± 20 | 1.02 |
| | | | 300% 1,200 ± 31 | 300% 1,197 ± 27 | 1.00 |
| Tensile Strength | psi | ASTM D412 | 2,583 ± 92 | 2,278 ± 29 | 0.88 |
| Elongation at Break | % | ASTM D412 | 534 ± 14 | 492 ± 5 | 0.92 |
| Tear, die C | pli | ASTM D624 | 242 ± 12 | 240 ± 25 | 0.99 |

[1]Mechanical Properties: Part thickness was 2 mm, the part pressure was 774 psi and cured at 145° C. for 30 minutes.

Although the present invention has been explained hereinabove by way of preferred embodiments thereof, it should be pointed out that the scope of the claims should not be limited by these preferred embodiments set forth in the examples, but should be given the broadest interpretation consistent with the description as a whole.

The invention claimed is:

1. A thermokinetic mixer for the regeneration of vulcanized crumb rubber, said thermokinetic mixer comprising:
   an air tight stationary chamber having an inlet for receiving a crumb rubber mixture, said stationary chamber having sidewalls provided with a cooling jacket, the sidewalls having an inner non-uniform surface; the stationary chamber being also provided with a cooling injection system for injection of a cooling agent within the stationary chamber, the cooling agent comprising water; the stationary chamber having an outlet for exiting regenerated crumb rubber; and
   a rotor shaft co-axially extending into the stationary chamber, said rotor shaft having blades extending from the shaft into the chamber and a controlled speed varying up to at least about 1800 rpm.

2. The thermokinetic mixer of claim 1, wherein the blades have an outer non-uniform surface.

3. The thermokinetic mixer of claim 2, wherein the non-uniform surface is at least one of a textured surface and a beaded non-smooth surface.

4. The thermokinetic mixer of claim 3, wherein said non-uniform surface is lined with hardened steel in the form of a welded bead or machined in the same form as the welded bead.

5. The thermokinetic mixer of claim 2, wherein at least one of the blades is rotated or longitudinally twisted.

6. The thermokinetic mixer of claim 2, wherein said blades are in a non-parallel relationship one to another.

7. The thermokinetic mixer of claim 1, wherein the injection device comprises a nozzle device to inject the cooling agent into the stationary chamber in a form of a mist or a jet stream.

8. The thermokinetic mixer of claim 1, wherein the injection device comprises several injection nozzles extending in the sidewalls of the stationary chamber.

9. The thermokinetic mixer of claim 1, further comprising a vacuum pump in connection with the stationary chamber for removing air and vapour out of the chamber.

10. The thermokinetic mixer of claim 1, further comprising a pre-mixer for mixing vulcanized crumb rubber and a lubricant at room temperature to form the crumb rubber mixture for feeding into the stationary chamber.

11. The thermokinetic mixer of claim 10, further comprising a transfer device for transferring the mixture from the pre-mixer into the stationary chamber.

12. The thermokinetic mixer of claim 11, wherein the transfer device is an air tight transfer device.

13. The thermokinetic mixer of claim 12, wherein the transfer device comprises a loading and isolating compartment.

14. The thermokinetic mixer of claim 13, wherein the transfer device comprises a worm drive or screw drive located around the shaft near the inlet of the stationary chamber.

15. The thermokinetic mixer of claim 11, further comprising a cooling device, downstream of the outlet, to cool down the regenerated crumb rubber.

16. The thermokinetic mixer of claim 15, wherein the cooling device is a drum tumbler.

17. The thermokinetic mixer of claim 9, wherein the cooling agent is water which, when the thermokinetic mixer is in operation, vaporizes, carrying out sulphur derivatives from the partial devulcanization of the rubber, the vacuum pump evacuating at least some of the vaporized water and sulphur derivatives from the stationary chamber.

18. A thermokinetic mixer for the regeneration of vulcanized crumb rubber, said thermokinetic mixer comprising:
   an air tight stationary chamber having an inlet for receiving a crumb rubber mixture, said stationary chamber having sidewalls provided with a cooling jacket, the sidewalls having an inner non-uniform surface; the stationary chamber being also provided with a cooling injection system for injection of a cooling agent within the stationary chamber, the cooling agent comprising water; the stationary chamber having an outlet for exiting regenerated crumb rubber; and
   a rotor shaft co-axially extending into the stationary chamber, said rotor shaft having blades extending from the shaft into the chamber, the blades having an outer non-uniform surface, and a variable electric speed controller for controlling a speed of the shaft up to at least about 1800 rpm.

19. A thermokinetic mixer for the regeneration of vulcanized crumb rubber, said thermokinetic mixer comprising:
   an air tight stationary chamber having an inlet for receiving a crumb rubber mixture, said stationary chamber having sidewalls provided with a cooling jacket, the sidewalls having an inner non-uniform surface; the stationary chamber being also provided with a cooling injection system for injection of a cooling agent within the stationary chamber, the cooling agent comprising water; the stationary chamber having an outlet for exiting regenerated crumb rubber;
   a vacuum pump connected to the stationary chamber for removing air and vapour out of the stationary chamber; and
   a rotor shaft co-axially extending into the stationary chamber, said rotor shaft having blades extending from the shaft into the stationary chamber, the blades having an outer non-uniform surface, and a controllable speed varying up to at least about 1800 rpm.

* * * * *